(12) United States Patent
Hosoda et al.

(10) Patent No.: US 8,098,563 B2
(45) Date of Patent: Jan. 17, 2012

(54) OBJECTIVE LENS ACTUATOR

(75) Inventors: Ryozo Hosoda, Osaka (JP); Togo Kojima, Osaka (JP); Sotaro Hayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 12/707,405

(22) Filed: Feb. 17, 2010

(65) Prior Publication Data

US 2010/0208570 A1  Aug. 19, 2010

(30) Foreign Application Priority Data

Feb. 18, 2009  (JP) ............................. P. 2009-034987

(51) Int. Cl.
*G11B 7/00* (2006.01)
(52) U.S. Cl. .................... 369/112.23; 720/671; 720/681
(58) Field of Classification Search ............... 369/44.11, 369/44.14, 44.15, 44.16, 112.23; 720/671, 720/681–688
See application file for complete search history.

(56) References Cited

U.S. PATENT DOCUMENTS

| | | | | |
|---|---|---|---|---|
| 5,001,700 A | * | 3/1991 | Rowden et al. ............... | 720/712 |
| 6,657,944 B2 | * | 12/2003 | Mohri et al. .................. | 720/681 |
| 7,873,970 B2 | * | 1/2011 | Arai et al. ..................... | 720/671 |
| 2002/0060974 A1 | * | 5/2002 | Murata et al. ............ | 369/112.23 |
| 2006/0087932 A1 | * | 4/2006 | Hayashi et al. ............ | 369/44.14 |
| 2006/0114769 A1 | * | 6/2006 | Mashiyama et al. ........ | 369/44.14 |
| 2007/0014205 A1 | * | 1/2007 | Inui ............................. | 369/44.14 |
| 2007/0033602 A1 | | 2/2007 | Hashimoto et al. ........... | 720/671 |
| 2007/0171777 A1 | * | 7/2007 | Takahashi ................... | 369/44.15 |
| 2008/0279060 A1 | | 11/2008 | Nishi et al. .................. | 369/44.37 |
| 2010/0091635 A1 | * | 4/2010 | Hayashi et al. .......... | 369/112.23 |

FOREIGN PATENT DOCUMENTS

| | | |
|---|---|---|
| EP | 2 178 085 A1 | 4/2010 |
| JP | 2001-297478 | 10/2001 |
| JP | 2002-269790 | 9/2002 |
| JP | 2007-305179 | 11/2007 |

* cited by examiner

*Primary Examiner* — Wayne Young
*Assistant Examiner* — Brenda Bernardi
(74) *Attorney, Agent, or Firm* — Morgan, Lewis & Bockius LLP (57) ABSTRACT

An objective lens actuator includes a lens holder, a protector holder, and a protector. The lens holder in which the objective lens is provided has a face configured to oppose the disc. The protector holder is provided on the face of the lens holder. The protector is formed with an opening defined by a first inner face, a second inner face and a bottom face between the first inner face and the second inner face. The protector has a parallelepiped shape elongating in a first direction parallel to the disc. A part of the protector is inserted in the opening so as to contact the first inner face and the second inner face and to extend from the bottom face toward the disc. A first distance between an end of the protector in a second direction in which the protector extends toward the disc and the disc is shorter than a second distance between the objective lens and the disc. A gap is formed between an end of the opening and an end of the protector in the first direction.

11 Claims, 7 Drawing Sheets

OBJECTIVE LENS ACTUATOR

BACKGROUND

The present invention relates to an objective lens actuator and, more particularly, to an objective lens actuator including a collision avoidance mechanism that is provided on a lens holder equipped with an objective lens as an optical element.

In an optical disk drive for use with discs, such as a compact disc (CD), a multipurpose digital disc (DVD), a high-definition DVD, a Blu-ray disc (BD), and the like, a recording surface of the disc serving as a recording medium is irradiated with an optical beam, whereby information is recorded and reproduced.

In an objective lens actuator constituting an optical system of a recent optical disk drive, in order to optically process a high density disc such as a BD, a wavelength of the light source is made short (e.g., 405 nm for the BD), and a numerical aperture (NA) of an objective lens is increased (to; for instance, NA=0.85 for the BD), thereby making a spot of the optical beam focused on the recording surface of the disc small. When the numerical aperture of the objective lens is increased as mentioned above, a working distance (WD) which is an opposed distance between the objective lens and the disc surface achieved when the disc is optically processed by the objective lens actuator has hitherto been known to become extremely small.

Some of objective lens actuators hold a lens holder in a cantilever manner by a suspension wire that extends from a fixed member and that is made of a conductive thin wire having elasticity. In the objective lens actuator of this type, the lens holder having an objective lens is controllably displaced in both a focusing direction and a tracking direction by action of an electromagnetic drive mechanism along with flexural deformation of the suspension wire. Therefore, in the objective lens actuator requiring a very small WD as mentioned above, the disc surface may collide with the objective lens of the lens holder for any reasons (e.g., vibration and warpage of a disc), thereby causing flaws on the disc surface, a recording surface of the disc, or the surface of the objective lens.

To avoid such collision, the lens holder has hitherto been provided with a collision avoidance mechanism for preventing collision of the objective lens with the disc, which would otherwise be caused when the objective lens collides with the disc (see; Patent Document 1, Patent Document 2, and Patent Document 3).

Patent Document 1 discloses a plate-shaped collision avoidance member made of a material such as polyacetal. The collision avoidance member is inserted into a space defined in a lens holder from one side, whereby a tip end of the collision avoidance member is caused to project to the other side of the space. A protrusion provided on an end of the collision avoidance member is engaged with a stopper face provided on the other side of the space, thereby regulating the width of a projection of the collision avoidance member out from the objective lens.

Patent Document 2 describes protectors that are made of a POM-based resin material and formed at two locations along an edge of a lens barrel of an object lens provided on a lens holder so as to protrude out of the objective lens by outsert molding.

Patent Document 3 describes metal plates that are covered with a protective lubrication layer made of an amorphous carbon film, or the like and that are provided at a plurality of locations along an objective lens of a lens holder by the outsert molding so that the protective lubrication layer protrudes out of the objective lens.

[Patent Document 1] Japanese Patent Publication No. 2007-305179 A
[Patent Document 2] Japanese Patent Publication No. 2002-269790 A
[Patent Document 3] Japanese Patent Publication No. 2001-297478 A However, in a conventional art described in Patent Document 1, a lateral width and a longitudinal width of the space are arranged to suit a lateral width and a thickness (a longitudinal width) of the plate-shaped collision avoidance member, whereby the collision avoidance member is inserted into the space without a backlash. When a plate-piece-shaped collision avoidance member is pinched and inserted into the space of the lens holder by tip edges of a jig such as a tweezers, the collision avoidance member becomes easily caught by an edge on one side of the space. Thus, there has hitherto been a problem related to an assembly, that even an experienced operator can not readily perform the inserting operation.

In the conventional arts described in Patent Document 2 and Patent Document 3, it is necessary to use a sophisticated molding technique such as the outsert molding in order to assemble the collision avoidance mechanism. Therefore, there has been an unavoidable problem of complicated assembly processes and an increase in cost.

In addition, a sheet-shaped protector has hitherto been stuck to positions around which the objective lens of the lens holder is set. However, the technique has a potential risk of the protectors coming unstuck from the lens holder. Thus, the technique encounters a problem with the reliability of an effect of preventing collision of the objective lens with a disc (a protecting effect).

SUMMARY

It is therefore one aspect of the present invention is to provide an objective lens actuator including a collision avoidance mechanism, for prevent a collision of an objective lens with a disc, and having a protector placed on a lens holder in a standing position, an assembling workability thereof improved.

According to one aspect of the invention, there is provided an objective lens actuator having an objective lens configured to irradiate an optical beam to a disc, the objective lens actuator comprising:

a lens holder in which the objective lens is provided and having a face configured to oppose the disc;

a protector holder provided on the face of the lens holder, formed with an opening defined by a first inner face, a second inner face and a bottom face between the first inner face and the second inner face; and a protector having a parallelepiped shape elongating in a first direction parallel to the disc, a part of the protector inserted in the opening so as to contact the first inner face and the second inner face and to extend from the bottom face toward the disc, wherein a first distance between an end of the protector in a second direction in which the protector extends toward the disc and the disc is shorter than a second distance between the objective lens and the disc, and configured such that a gap is formed between an end of the opening and an end of the protector in the first direction.

The objective lens actuator may be configured such that a part of the first inner face and a part of the second inner face are inclined so as to expand a distance therebetween according to the second direction, the part of the first inner face including an end edge thereof in the second direction, and the part of the second inner face including an end edge thereof in the second direction.

The objective lens actuator may be configured such that the part of the first inner face is a planer chamfered face of the end edge of the first inner face, and connects one end of the end edge of the first inner face and the other end of the end edge of the first inner face, and the part of the second inner face is a planer chamfered face of the end edge of the second inner face, and connects one end of the end edge of the second inner face and the other end of the end edge of the second inner face.

The objective lens actuator may be configured such that the protector holder includes a first wall having the first inner face, a second wall having the second inner face, and a bottom wall having the bottom face which supports so as to regulate a difference of the first distance and the second distance.

The objective lens actuator may be configured such that the first wall is formed with a groove connecting the first inner face to an outer face of the first wall opposite to the first inner face, and the second wall is formed with a groove connecting the second face to an outer face of the second wall opposite to the second inner face.

The objective lens actuator may be configured such that a bottom of the groove of the first wall is reached to the bottom face, an adhesive, by which the protector is fixed with the protector holder, is applied to a space defined by the bottom and inner faces of the groove.

The objective lens actuator may further comprise: another protector holder provided on the face of the lens holder, formed with a second opening defined by a third inner face, a fourth inner face and a second bottom face between the third inner face and the fourth inner face; and another protector having a parallelepiped shape elongating in the first direction, a part of the another protector inserted in the second opening so as to contact the third inner face and the fourth inner face and to extend from the second bottom face toward the disc, wherein a third distance between an end of the another protector in the second direction is shorter than a fourth distance between the objective lens and the disc, the objective lens may be disposed between the protector holder and the another protector holder.

The objective lens actuator may be configured such that the first direction is a direction along with a radius direction of the disc.

The objective lens actuator may be configured such that the protector is a square shaped plate.

The objective lens actuator may be configured such that the first wall and the second wall are disposed in this order according to a direction in which the disc is rotated.

It is therefore another aspect of the present invention is to provide a collision avoidance mechanism for preventing a collision between an objective lens and a disc, comprising:

a protector holder provided on a face of a lens holder in which the objective lens is provided, formed with an opening defined by a first inner face, a second inner face and a bottom face between the first inner face and the second inner face; and a protector having a parallelepiped shape elongating in a first direction parallel to the disc, a part of the protector inserted in the opening so as to contact the first inner face and the second inner face and to extend from the bottom face toward the disc, wherein a first distance between an end of the protector in a second direction in which the protector extends toward the disc and the disc is shorter than a second distance between the objective lens and the disc, and configured such that there is a gap between an end of the opening and an end of the protector in the first direction.

DETAILED DESCRIPTION OF EXEMPLIFIED EMBODIMENTS

Figure 1:
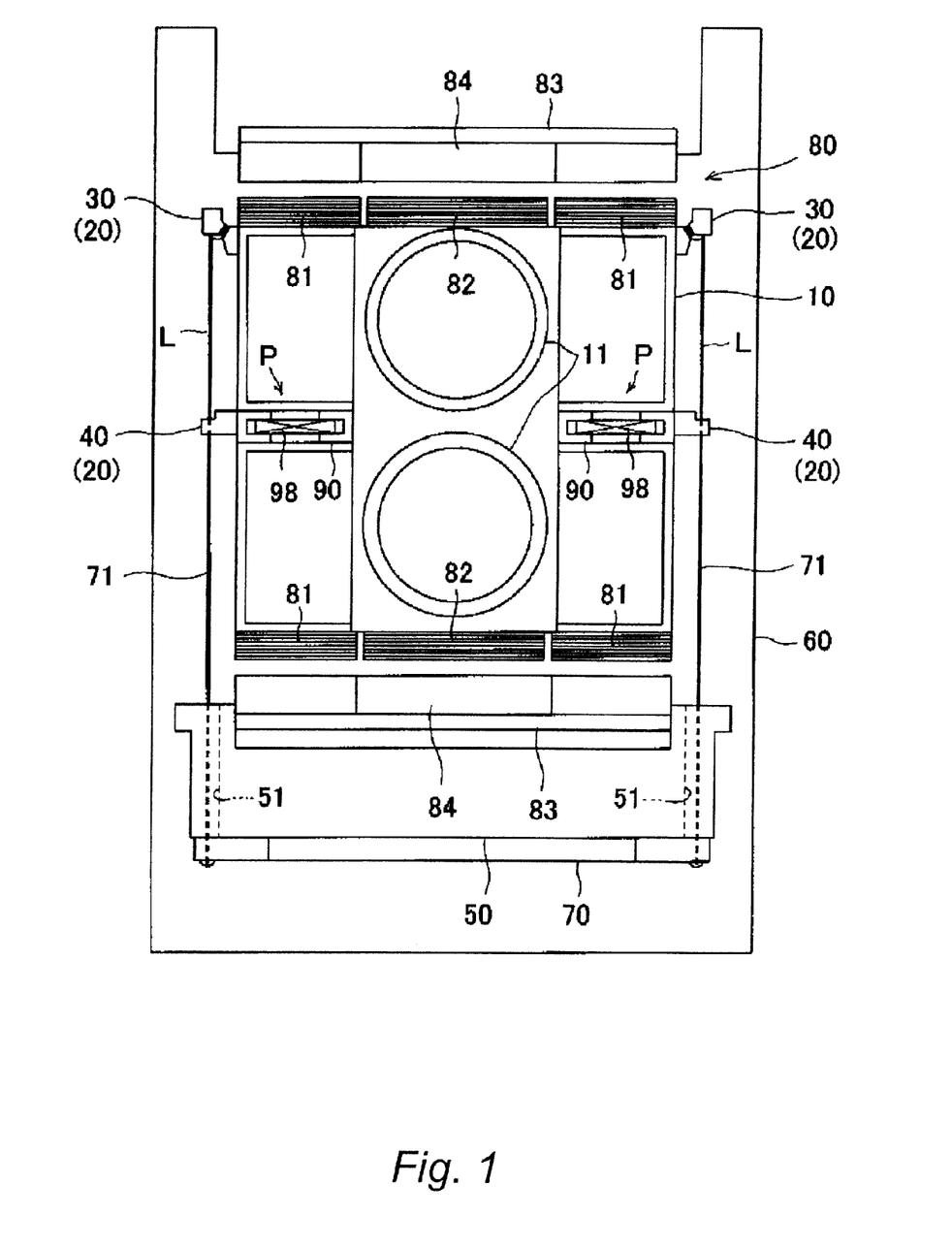
FIG. 1 is a plan view of an objective lens actuator of an embodiment according to the present invention.
Figure 2:
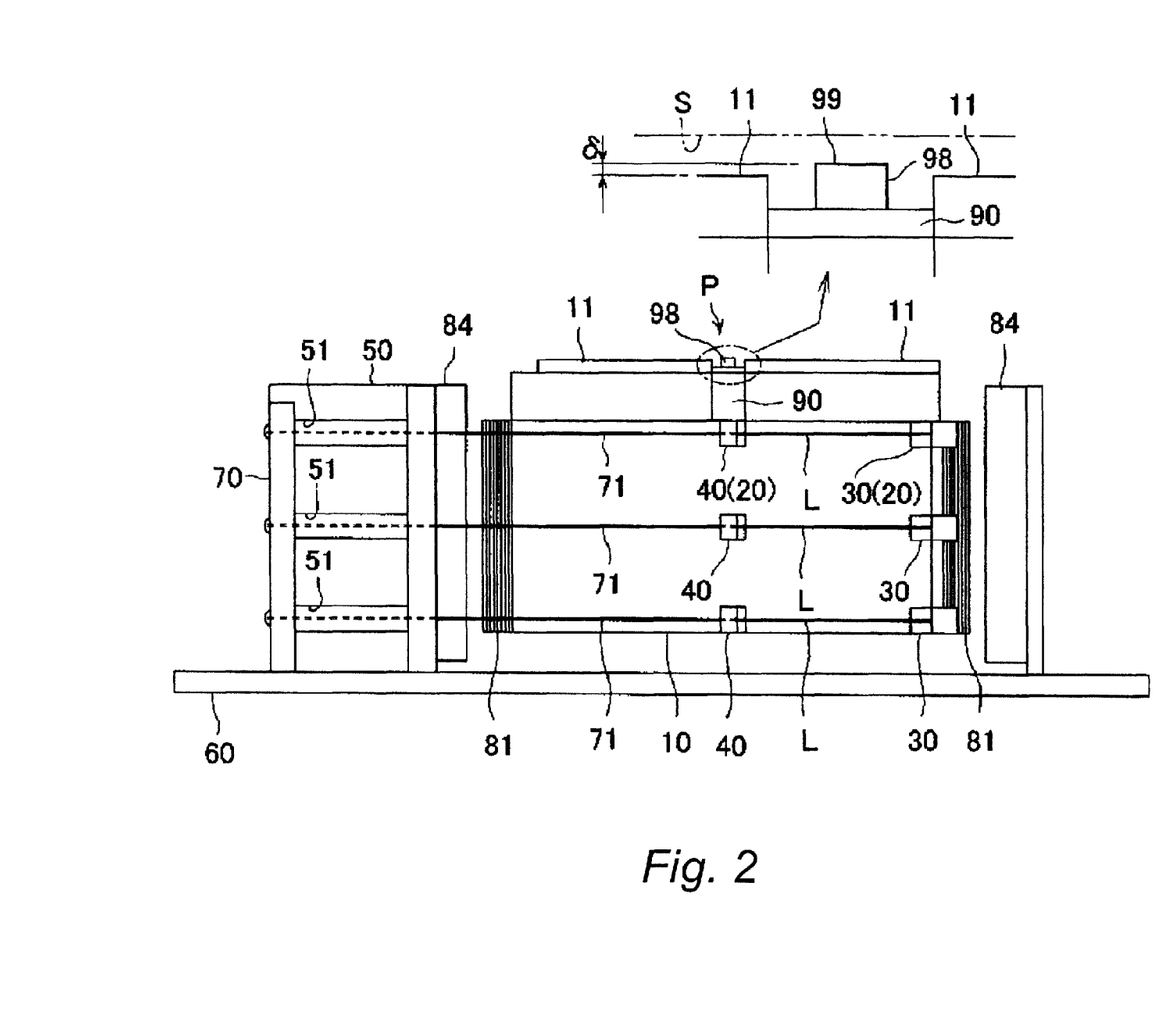
FIG. 2 is a side view of the objective lens actuator.

In an objective lens actuator shown in FIGS. 1 and 2, a lens holder 10, is a made of a resin molded member having a rectangular shape in a plane view, and is equipped with an objective lens 11 at a substantial center in a left-right direction thereof (a widthwise direction). Projections 20 projected from right and left side faces of the lens holder 10 respectively in opposite directions each other are provided on both sides of the lens holder 10, and the projections 20 include first projections 30 and second projections 40.

A fixed member 50 is mounted on a base plate 60 made of a metal sheet, and a rear face of the base plate 60 is provided with a wiring substrate 70. Grooves 51 extending in a front-rear direction of the lens holder 10 (a lengthwise direction) are formed on both sides of the fixed member 50. Suspension wires 71 whose bottom ends are soldered to the wiring substrate 70 extend forwardly of the fixed member 50 through the grooves 51. The grooves 51 are filled with a damping material. The suspension wires 71 are made of a conductive thin wire having elasticity. A tip end area L of each of the suspension wires 71 is fixed to a corresponding projection 20 of the lens holder 10 comprised of the first projection 30 and the second projection 40.

The objective lens actuator is equipped with an electromagnetic drive mechanism 80. The electromagnetic drive mechanism 80 has coils 81 and 82 provided respectively on front and rear end faces of the lens holder 10 and magnets 84 fixed to yokes 83. The yokes 83 are made by cutting portions of the base plate 60 and raising them straight up, and is disposed opposite the coils 81 and 82. The coils 81 and 82 of the electromagnetic drive mechanism 80 include four focusing coils and two tracking coils. One suspension wire 71 is provided in correspondence with each of these coils 81 and 82. The six suspension wires 71 are divided in a pair of threes. The pair of the three suspension wires are placed on either side of the lens holder 10 in a sandwiched manner. The suspension wires are fixed to the projections 20 of the lens holder 10 with the same structure respectively.

A control signal is supplied to the coils 81 and 82 through a circuit pattern (not shown) of the wiring substrate 70 and the suspension wires 71. The lens holder 10 is displaced in both a focusing direction and a tracking direction by action of the electromagnetic drive mechanism 80 having the coils 81 and 82, and the plurality of suspension wires 71 are deformed flexural according to the displacement of the lens holder 10.

As shown in FIG. 1, a collision avoidance mechanisms P are positioned symmetrically sandwiching an area of the lens holder 10 where objective lens set areas. Each of the collision avoidance mechanisms P include a protector holding frame 90 and a rectangular-plate-shaped protector 98 accommodated in the protector holding frame 90 in a standing position. As shown in FIG. 2, one end face 99 of each of the protectors 98 opposes, a surface S of a circular disc having a disk shape and serving as a recording medium, while forming a space therebetween. Further, the one end face 99 of each of the protectors 98 projected than the objective lens 11 toward the surface S of the disc by a width δ. In a case that the opposition interval (WD) between the objective lens 11 and the disc surface S is very small, with any factor such as warpage of the disc and vibration arises, the one end face 99 of each of the protectors 98 comes in contact with the disc surface S before the objective lens 11 collides with the disc surface S. As a consequence, collision of the objective lens 11 with the disc surface S is prevented, thereby eliminating a potential risk of infliction of flaws on the disc surface S, damage on a recording surface of the disc, and flaws on the surface of the objective lens 11. The protector 98 exhibiting a superior lubricating characteristic has a rectangular shape plate. The protector 98 is made of a material whose hardness is lower than the disc surface S, such as rubber material and synthetic-resin including polyacetal and polycarbonate.

The configuration of the protector holding frame 90, processes for assembling the protectors 98, and the like, are now described by reference to FIGS. 3 to 7.

Figure 3:
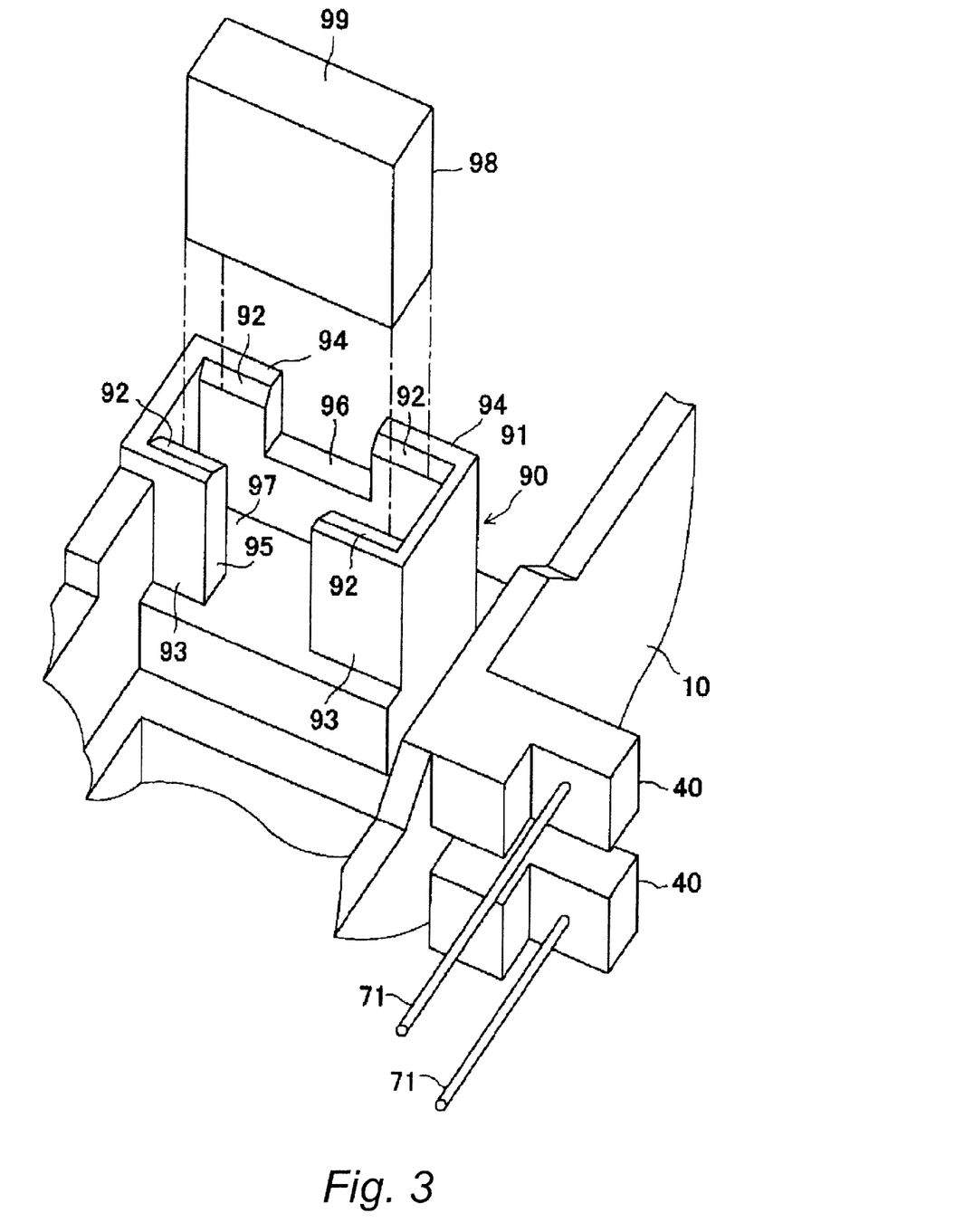
FIG. 3 is a perspective view showing a protector holding frame and a protector.
Figure 4:
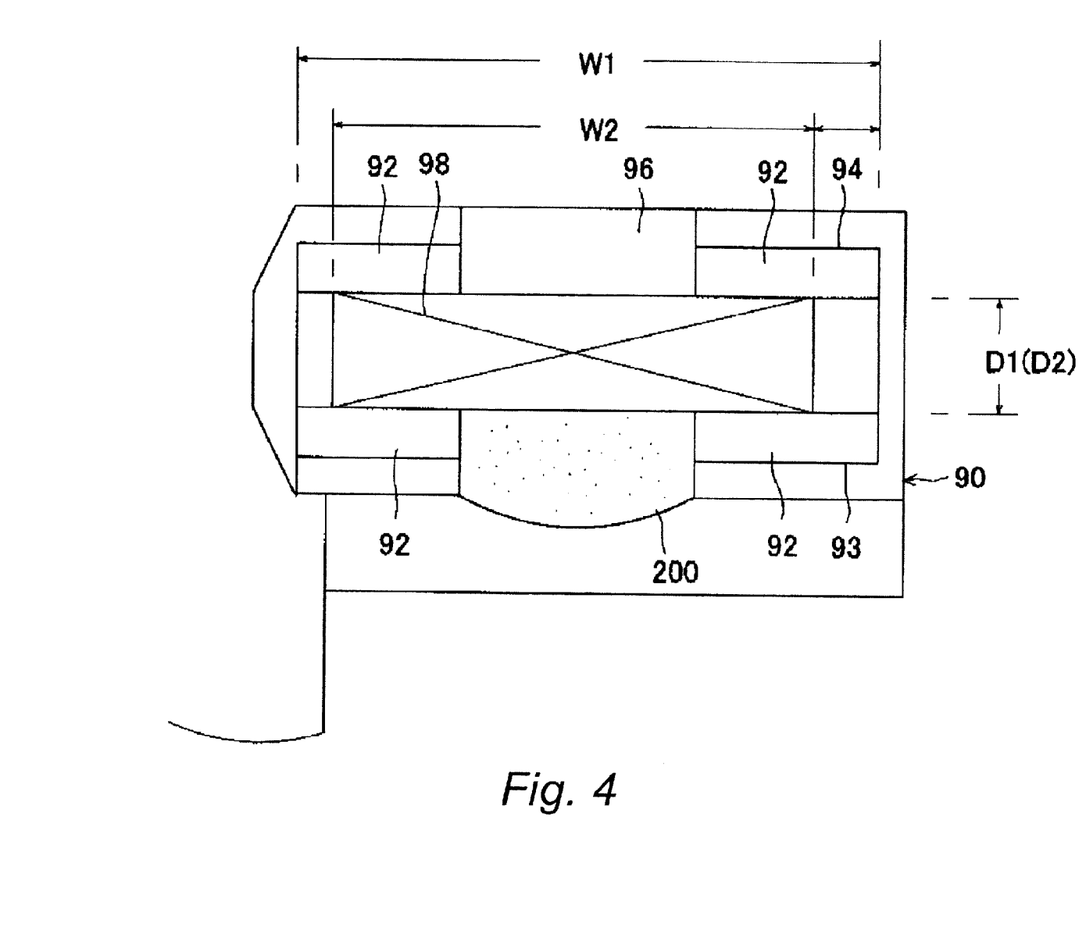
FIG. 4 is a plan view of the protector holding frame housing the protector.
Figure 5:
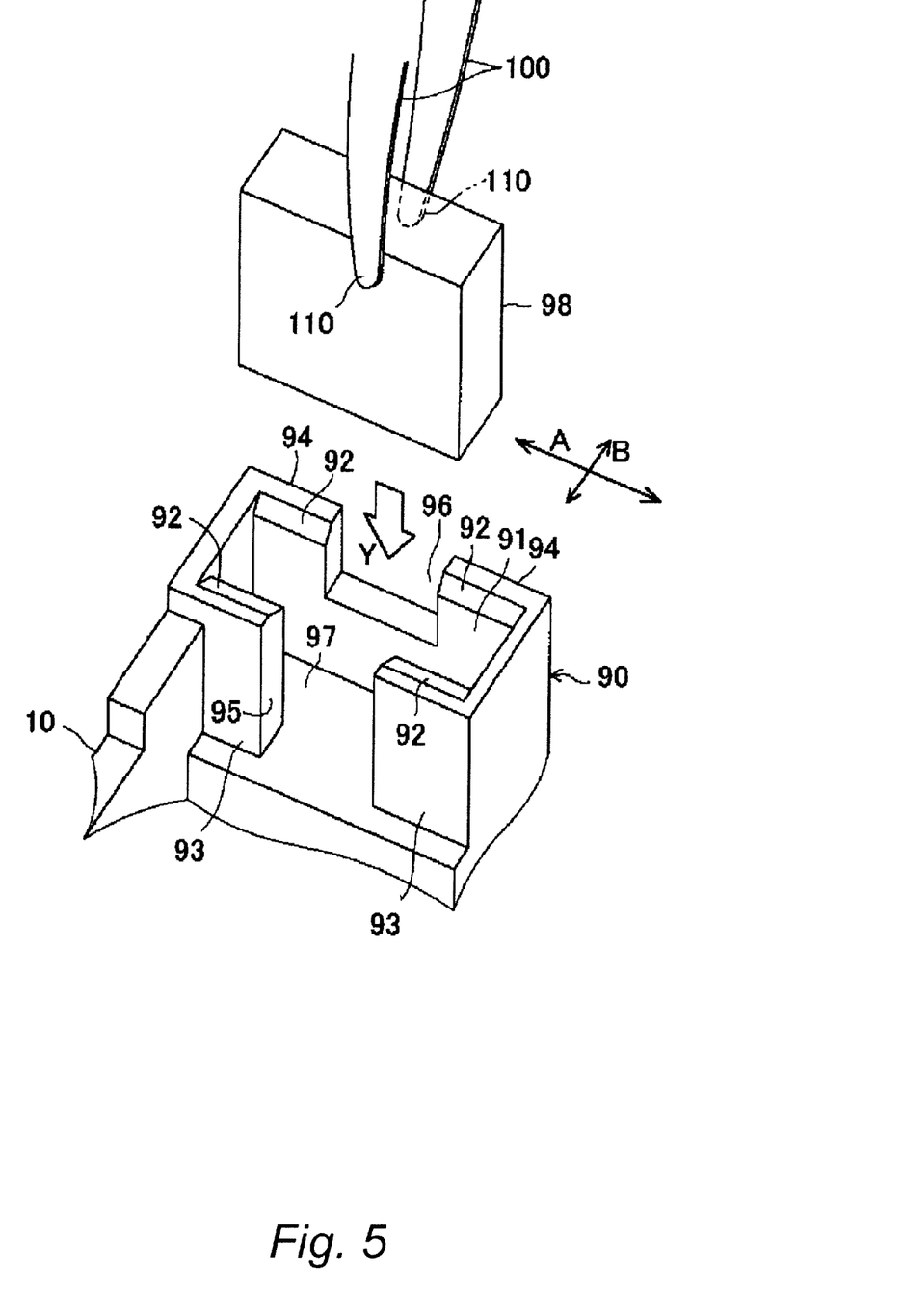
FIG. 5 is a perspective view showing an operating process of assembling the protector.
Figure 6:
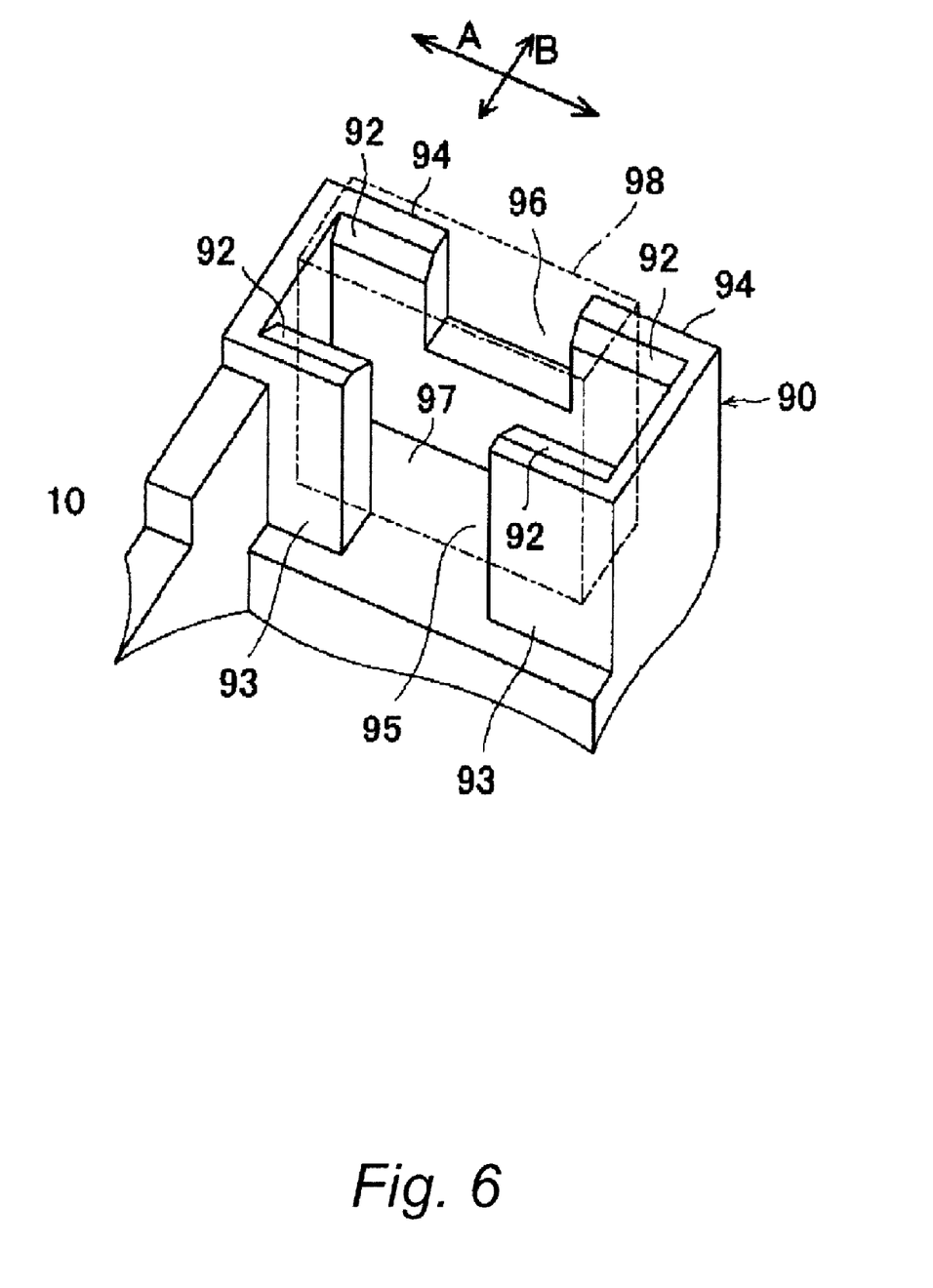
FIG. 6 is a perspective view showing the protector holding frame housing the protector.

As shown in FIG. 3, the protector holding frame 90 is made of a resin-molded member integrally formed with the lens holder 10. The protector holding frame 90 has a cylindrical shape that stands upright on the face of the lens holder 10 and that assumes a horizontally-elongated rectangle in a plane view. An insert port 91 is provided in an end of the protector holding frame 90. As shown in FIG. 4, the insert port 91 is formed with a horizontally-elongated opening whose lateral width W1 in the widthwise direction is longer than a lateral width W2 of the protector 90 in the widthwise direction. The protector 90 has a rectangular plate shape and a width D1 thereof. The width D1 is equal to a thickness D2 of the protector in the lengthwise direction. A guide face 92 is provided on each of two edges of the insert port 91 in a direction B shown by arrow B in FIGS. 5 to 7. The guide faces 92 are flat faces chamfered to an angle of 45°. The chamfered faces are formed over inner corners, throughout their lengths, of respective edges of a pair of sidewalls 93 and 94 opposing each other in the direction B. Release recesses 95 and 96 are formed in the pair of sidewalls 93 and 94 of the protector holding frame 90, as shown in FIG. 5. The release recesses 95 and 96 allows tip edges 110 of a jig (e.g., convergent tweezers) 100 used when the tip edges pinch the protector 98 to fit therein, to thus accommodate the protector in the protector holding frame 90. The release recess 95 of the release recesses 95 and 96 has a depth reaching a bottom wall 97 of the protector holding frame 90. Thus, a face of the bottom wall 97 is extended by a width equal to the thickness of the sidewall 93. On the contrary, the other release recess 96 has a depth reaching a middle position of the sidewall 94.

Processes for assembling the protector 98 into the protector holding frame 90, and the like, are described.

As shown in FIG. 5, assembly is carried out by inserting one end of the protector 98 into the insert port 91 of the protector holding frame 90 as indicated by arrow Y while pinching the end with a jig 100, such as convergent tweezers, to thus fit the protector 98 into the protector holding frame 90.

A space between the pair of sidewalls 93 and 94 of the protector holding frame 90 achieved along the direction B of the longitudinal width; namely, the width D2 of the insert port 91 (see FIG. 4), is equal to the thickness D1 of the protector 98. In the foregoing insertion process, the other end of the protector 98 pinched with the jig 100 has hitherto been conceived to be caught by the inner corners of the insert port 91 of the protector holding frame 98, thereby posing difficulty on inserting operation. However, in the embodiment, the lateral width W1 of the insert port 91 is longer than the lateral width W2 of the rectangular-plate-shaped protector 90, which is helpful in facilitating performance of inserting operation. Further, the guide surfaces 92 are provided along both edges of the insert 91 in the direction B of its longitudinal width. Even if a lower end of the protector 98 is engaged with the guide surfaces 92 as indicated by a long double-dashed line in FIG. 7, the other end of the protector 98 slides over the guide surfaces 92 so as to be guided to the interior of the protector holding frame 90 by continually performing processing pertaining to the insertion process. Therefore, in the embodiment, the lateral width W1 of the insert port 91 is longer than the lateral width W2 of the rectangular-plate-shaped protector 90, whereby the insertion process is facilitated. In addition, the insertion process can be said to be much facilitated by action of the guide surfaces 92.

The tip edges 110 of the jig 100 pinching the protector 98 fit to the release recesses 95 and 96 formed with the pair of sidewalls 93 and 94 of the protector holding frame 90 when the protector 98 is inserted and accommodated in the protector holding frame 90. Therefore, the tip edges 110 of the jig 100 do not obstruct the inserting operation, which would otherwise arise when colliding with the protector holding frame 90. Thereby, the other end of the protector 98 can be superimposed on the bottom wall 97 of the protector holding frame 90 without fail by inserting the protector 98 while pinching the protector 98 with the tip edges 110 of the jig 100 into the protector holding frame 90. This becomes helpful in facilitating accurate determination of the width δ of projection of the one end face 99 of each of the protectors 98 from the objective lens 11.

After the protector 98 is assembled into the protector holding frame 90, the pair of sidewalls 93 and 94 of the protector holding frame 90 contact two faces of the protector 98 in the thicknesswise direction. The protector 98 is therefore pinched in its thicknesswise direction between the pair of sidewalls 93 and 94 without a backlash. Therefore, so long as the direction of lateral width A of the insert port 91 of the protector holding frame 90 is aligned to the radial direction of the disc surface S placed opposite the objective lens 11, the thicknesswise direction of the protectors 98 is brought in alignment with a turning direction of the disc. Hence, even if one end of the protector 98 comes in contact with a turning disc, the protectors 98 reliably exhibit a protecting effect without involvement of a backlash for a long period of time.

Figure 7:
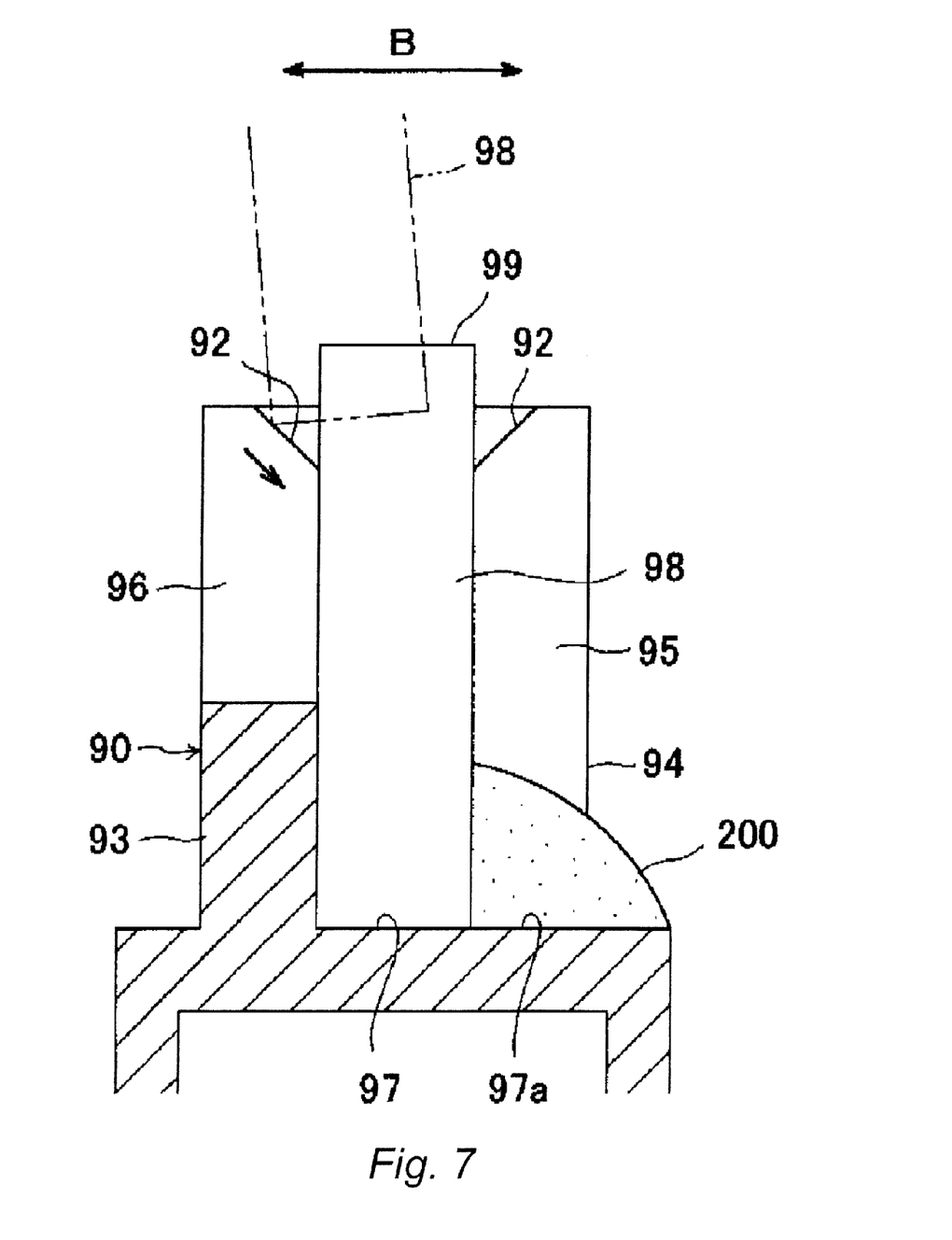
FIG. 7 is a longitudinal sectional view showing a guide face and a location where an adhesive is to be applied.

After the protectors 98 is inserted and accommodated into the respective protector holding frames 90, a process for bonding the protectors 98 to the protector holding frames 90 with an adhesive is performed. In the embodiment, an area to be applied with an adhesive during the bonding process is defined as an enclosed area that is surrounded by the bottom wall 97 of the protector holding frame 90 and a wall face of the release recess 95 of one sidewall 93. An adhesive 200 is applied to the enclosed area as shown in FIG. 7. It thus becomes possible to readily apply the adhesive 200 to an extended area 97a of the bottom wall 97 of the protector holding frame 90. Further, a bond area of the adhesive 200 is also increased, whereby reliability of adhesion between the protector 98 and the corresponding protector holding frame 90 is also enhanced.

In the embodiment, the lateral width W1 of the insert port 91 of the protector holding frame 90 is longer than the lateral width W2 of the rectangular-plate-shaped protector 90. The guide faces 92 are provided along the two edges of the insert port 91 in the direction B of its longitudinal width. By both features, the process of inserting the protectors 98 is made easy to perform. In this regard, so long as the lateral width W1 of the insert port 91 is longer than the lateral width W2 of the rectangular-plate-shaped protector 90, the insertion processes can be correspondingly, readily performed even when the guide faces 92 are omitted.

In this embodiment, one end face of the protector 98 placed in an upright position in each of the lens holders 10 opposes a disc surface. Hence, the reliability of a protecting effect is enhanced as compared with that achieved in a case where a sheet-like protector is affixed to a neighborhood of a location where an objective lens of the lens holder is set. It becomes possible to provide the lens holder with the protectors without a sophisticated molding technique such as outsert molding. Hence, assembly processes are simplified correspondingly, which makes it easy to avoid an increase in cost.

Further, the guide surfaces 92 are formed from flat chamfered surfaces formed on, over their lengths, inner corners of the edges of the sidewalls 93, 94 of the protector holding frame 90. Therefore, there is yielded an advantage of the ability to simultaneously form the guide surfaces 92 during molding of the protector holding frame 90.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

For example, although the collision avoidance mechanisms P are placed symmetrically about the objective lens 11 with the lens sandwiched therebetween in their right-left direction, the mechanisms, in this respect, may also be placed symmetrically about the objective lens 11 with the lens being sandwiched between the mechanisms in both front-rear and right-left directions.

The protector 98 may be provided in inclined position that an end of the protector 98 of a bottom face side is displaced at upstream side of a rotation direction in which the disc rotates with respect to an end of the protector 98 of a disc side. Further, a disc side edge of the protector 98 opposing the rotation direction may be rounded or chamfered. In this configuration, the flaws by the collision of the disc and the objective lens 11 can be further prevented.

The protector 98 may have a square-shaped plate. In this configuration, aligning an orientation of the protector 98 is not need in the inserting operation. Therefore, the assembling workability can be further improved.

The disclosures of Japanese Patent Application No. 2009-034987 filed Feb. 18, 2009 including specification, drawings and claims is incorporated herein by reference in its entirety.

What is claimed is:

1. An objective lens actuator having an objective lens configured to irradiate an optical beam to a disc, the objective lens actuator comprising:
a lens holder in which the objective lens is provided and having a face configured to oppose the disc;
a protector holder provided on the face of the lens holder, formed with an opening defined by a first inner face, a second inner face and a bottom face between the first inner face and the second inner face; and
a protector having a parallelepiped shape elongating in a first direction parallel to the disc, a part of the protector inserted in the opening so as to contact the first inner face and the second inner face and to extend from the bottom face toward the disc, wherein a first distance between an end of the protector in a second direction in which the protector extends toward the disc and the disc is shorter than a second distance between the objective lens and the disc,
wherein a gap is formed between an end of the opening and an end of the protector in the first direction.

2. The objective lens actuator as set forth in claim 1, wherein:
a part of the first inner face and a part of the second inner face are inclined so as to expand a distance there between according to the second direction,
the part of the first inner face including an end edge thereof in the second direction, and
the part of the second inner face including an end edge thereof in the second direction.

3. The objective lens actuator as set forth in claim 2, wherein:
the part of the first inner face is a planer chamfered face of the end edge of the first inner face, and connects one end of the end edge of the first inner face and the other end of the end edge of the first inner face, and
the part of the second inner face is a planer chamfered face of the end edge of the second inner face, and connects one end of the end edge of the second inner face and the other end of the end edge of the second inner face.

4. The objective lens actuator as set forth in claim 1, wherein:
the protector holder includes a first wall having the first inner face, a second wall having the second inner face, and a bottom wall having the bottom face which supports so as to regulate a difference of the first distance and the second distance.

5. The objective lens actuator as set forth in claim 4, wherein:
the first wall is formed with a groove connecting the first inner face to an outer face of the first wall opposite to the first inner face, and
the second wall is formed with a groove connecting the second face to an outer face of the second wall opposite to the second inner face.

6. The objective lens actuator as set forth in claim 5, wherein:
a bottom of the groove of the first wall is reached to the bottom face,
an adhesive, by which the protector is fixed with the protector holder, is applied to a space defined by the bottom and inner faces of the groove.

7. The objective lens actuator as set forth in claim 1, further comprising:
another protector holder provided on the face of the lens holder, formed with a second opening defined by a third inner face, a fourth inner face and a second bottom face between the third inner face and the fourth inner face; and
another protector having a parallelepiped shape elongating in the first direction, a part of the another protector inserted in the second opening so as to contact the third inner face and the fourth inner face and to extend from the second bottom face toward the disc, wherein a third distance between an end of the another protector in the second direction is shorter than a fourth distance between the objective lens and the disc,
wherein the objective lens is disposed between the protector holder and the another protector holder.

8. The objective lens actuator as set forth in claim 1, wherein:
the first direction is a direction along with a radius direction of the disc.

9. The objective lens actuator as set forth in claim 1, wherein:
the protector is a square shaped plate.

10. The objective lens actuator as set forth in claim 6, wherein:
the first wall and the second wall are disposed in this order according to a direction in which the disc is rotated.

11. A collision avoidance mechanism for preventing a collision between an objective lens and a disc, comprising:

a protector holder provided on a face of a lens holder in which the objective lens is provided, formed with an opening defined by a first inner face, a second inner face and a bottom face between the first inner face and the second inner face; and a protector having a parallelepiped shape elongating in a first direction parallel to the disc, a part of the protector inserted in the opening so as to contact the first inner face and the second inner face and to extend from the bottom face toward the disc, wherein a first distance between an end of the protector in a second direction in which the protector extends toward the disc and the disc is shorter than a second distance between the objective lens and the disc, wherein there is a gap between an end of the opening and an end of the protector in the first direction.

* * * * *